Figure 1:
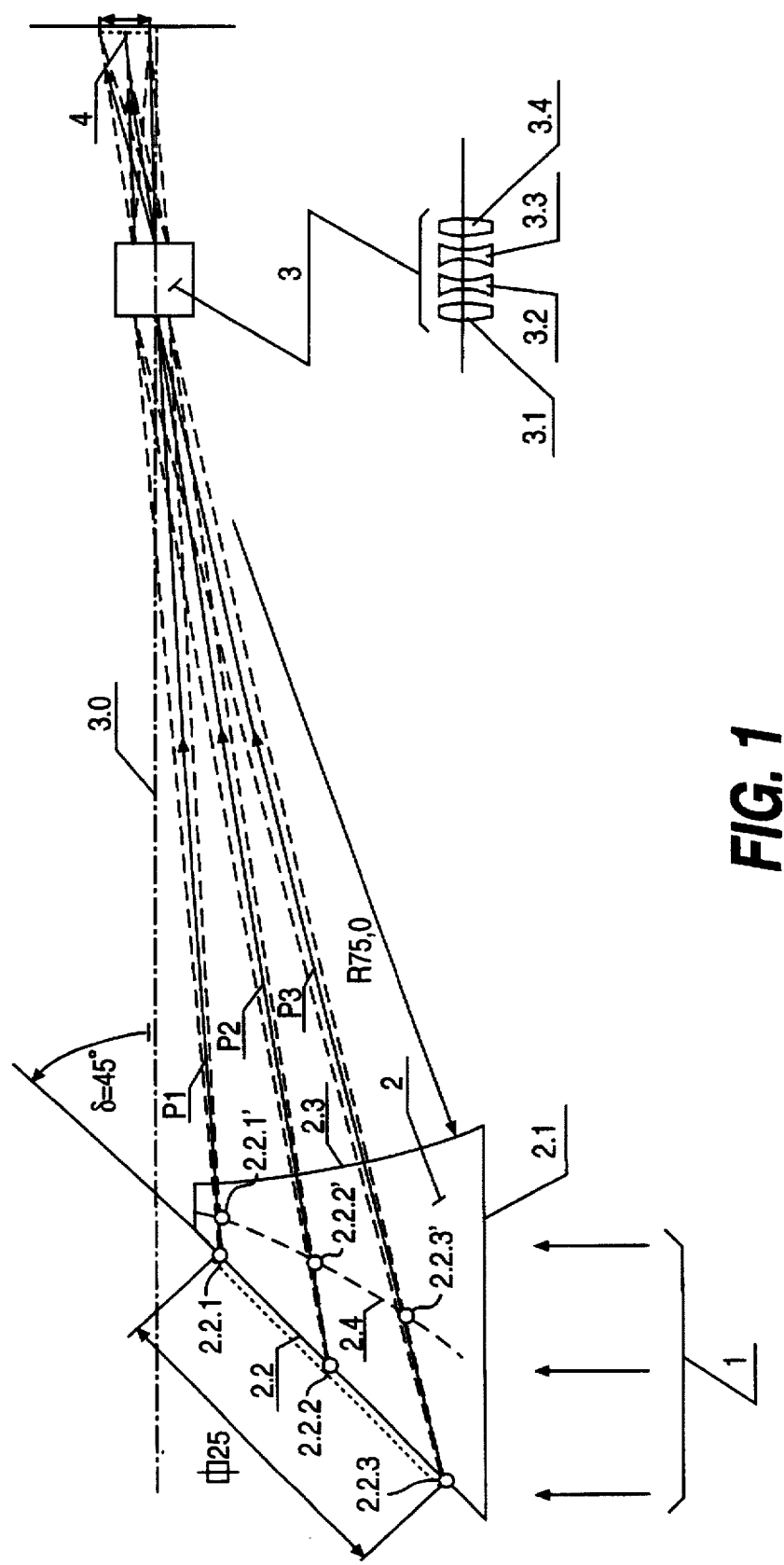

United States Patent [19]

Podmaniczky et al.

[11] Patent Number: 5,764,347
[45] Date of Patent: Jun. 9, 1998

[54] OPTICAL IMAGING SYSTEM

[75] Inventors: András Podmaniczky; Péter Kallo, both of Budapest; János Tálosi, Nagykanizsa; Imre Kiss, Budapest, all of Hungary

[73] Assignee: Dermo Trade Gyarto Es Kereskedo Rt., Budapest, Hungary

[21] Appl. No.: 765,944

[22] PCT Filed: Jun. 26, 1995

[86] PCT No.: PCT/HU95/00030

§ 371 Date: Jan. 13, 1997

§ 102(e) Date: Jan. 13, 1997

[87] PCT Pub. No.: WO96/02896

PCT Pub. Date: Feb. 1, 1996

[30] Foreign Application Priority Data

Jul. 13, 1994 [HU] Hungary .................... P9402087

[51] Int. Cl.$^6$ .................................................. G06K 9/74
[52] U.S. Cl. ........................................................ 356/71
[58] Field of Search ...................... 356/71; 382/124–127

[56] References Cited

U.S. PATENT DOCUMENTS

| 3,850,510 | 11/1974 | Baker. | |
|---|---|---|---|
| 4,783,167 | 11/1988 | Schiller et al. | |
| 5,175,593 | 12/1992 | Kumagi et al. | 356/71 |
| 5,222,152 | 6/1993 | Fishbine et al. | 356/71 |

FOREIGN PATENT DOCUMENTS

| 0 045 917 | 2/1982 | European Pat. Off. . |
| 0 280 041 | 8/1988 | European Pat. Off. . |
| 0 308 162 | 3/1989 | European Pat. Off. . |
| 0 585 141 | 3/1994 | European Pat. Off. . |
| 93/06510 | 4/1993 | WIPO . |

*Primary Examiner*—Frank G. Font
*Assistant Examiner*—Amanda Merlino
*Attorney, Agent, or Firm*—Finnegan, Henderson, Farabow, Garrett & Dunner, L.L.P.

[57] ABSTRACT

Optical imaging system between an object plane (2.2) of a total reflexion prism (2) and an image plane, mainly for a fingerprint reading apparatus, that comprises an optics (3) for imaging the object plane to the image plane, and an electronic image detector (4) in the image plane. The optics defines an optical axis (3.0) and input and output pupils, respectively. The total reflexion prism (2) is arranged in front of the input pupil of the optics (3). The prism has a first surface receiving light for illuminating the object plane through the interior of the prism and a further surface through which light reflected from the object plane passes towards the optics. The object plane closes an angle with the optical axis, which is preferably between 45° and 65° if the refraction index of the prism is between 1.5 and 1.85. The object plane (2.2) of the total reflexion prism (2) is offset relative to the optical axis (3.0) in normal direction and the image detector (4) is also offset in normal direction relative to the optical axis (3.0) to an extent which corresponds to the location of the image of said object plane.

11 Claims, 2 Drawing Sheets

OPTICAL IMAGING SYSTEM

The invention relates to an optical imaging system for imaging an object, mainly for a fingerprint reading apparatus, which comprises a total reflection prism with a total reflection surface that constitutes an object plane for receiving the object, the total reflection prism has a first transmitting surface for receiving light to illuminate the object when placed on the object plane through the interior of the prism, and a second transmitting surface for transmitting the light reflected from the total reflection surface; optical means with an optical axis and an input and output pupil, the input pupil receives the reflected light transmitted through the second transmitting surface and the optical means forms the image of the object plane in an image plane which is perpendicular to the optical axis; and an electronic image detector means located in the image plane.

Such a fingerprint identifying optical system is described in U.S. Pat. No. 5,187,748. In this patent a semi-transparent mirror is placed in slant position in the path between the total reflexion prism and the optics, the mirror divides the light coming from the prism, therefore the image will pass not only to the image detector but it will also enable direct observation. The total reflexion prism is arranged in the optical axis and its object plane is in a slant position relative to that axis. This slant position of the object plane is characteristic to all systems using a total reflexion prism.

In EP 0 585 141 A2 the image of a finger is provided by using a total reflection prism, an imaging optics and a CCD camera. The object plane is placed on the optical axis of the imaging optics and the consequence of this arrangement is that the image is distorted just as in case of the previously cited publication.

When a slant object plane is imaged to an image plane extending normal to the optical axis, owing to the path difference between the rays arriving from opposing edges of the object, distortions and an unacceptable decrease in image resolution will take place that can be compensated only by use of a sophisticated lens system and simultaneously by selecting a large object-to-optics distance. The large distance increases the size of the device and renders the handling more difficult or even excludes some applications, where the size is critical. The complexity of the lens system is a factor that increases costs.

A partial compensation for the path difference can be learned from EP 0 361 987 A1, wherein in the light path between the total reflexion prism and the optics a further prism and between the optics and the image detector a pin hole was inserted. Although by this solution the picture distortion was decreased below 5%, owing to the increased number of optical elements and to the presence of the pin hole a decreased sensitivity was obtained, i.e. a very high illumination is required for obtaining an image of acceptable brightness.

The object of the invention is to provide an optical imaging system of the kind defined hereinabove which, in spite of the slant object plane relative to the optical axis, can produce images with acceptable distortion and good resolution and has sufficient sensitivity, furthermore which has a geometrical length substantially smaller compared to known systems. The reduced dimensions are crucial for constructing a compact fingerprint reading apparatus.

According to the invention it has been recognized that the above problems can be decreased if the total reflexion prism is offset relative to the optical axis in normal direction so that the center of the object plane will not lie on the optical axis any more. From this offset arrangement it follows that the image detector i.e. a CCD matrix detector should also be placed in a position offset from the optical axis. This position corresponds to the one when the object plane is imaged in the image plane. The offset arrangement enables an easier dimensioning of the optics, the geometric distortion due to the geometrical differences in the path length decreases to an acceptable level, and the image can be of high resolution even if the object-to-optics distance is reduced.

The conditions for total reflexion are given if the object plane closes and angle between 45° and 65° with the optical axis and if the refraction index of the total reflexion prism is between 1.5 and 1.85.

In a preferable embodiment the second surface of the total reflexion prism is a curved surface which images the object plane into a further curved surface falling in the interior of the prism, and the average angle between this further curved surface and the optical axis is higher than the angle between the object plane and the optical axis.

The curved surface is preferably spherical and the center of the radius of its curvature falls on the optical axis in the close region of the input pupil of the optics. With such a design the effective path difference of the image forming main rays will be smaller than 4%.

For minimizing distortions and the point spread function the relative aperture of the optics is between f/6 and f/3.5 and the Petzval-sum of the optics is between −0.1 and 0.3.

Distortions can be decreased to acceptable levels even if using an optics with three or four simple lenses, wherein optimum values can be determined for the radii of curvature, refraction indices, thicknesses and spacings of the lenses.

The light intensity of the optical imaging system according to the invention is high, thus it has a sufficient sensitivity, its volume is small, and owing to the small number of optical elements used the manufacturing costs are also small. The electronic image processing enables the correction of the remaining slight distortion by using appropriate correction software in the system coupled to the CCD matrix detector.

The extent of "trapezoid" distortion depends on the angle between the object plane and the optical axis, and it lies between 4% and 8%. Also the extent of the point-spread function lies between 10–35 μm thus providing excellently sharp images.

The invention will now be described in connection with preferable embodiments thereof, in which reference will be made to the accompanying drawings.

Figure 2:
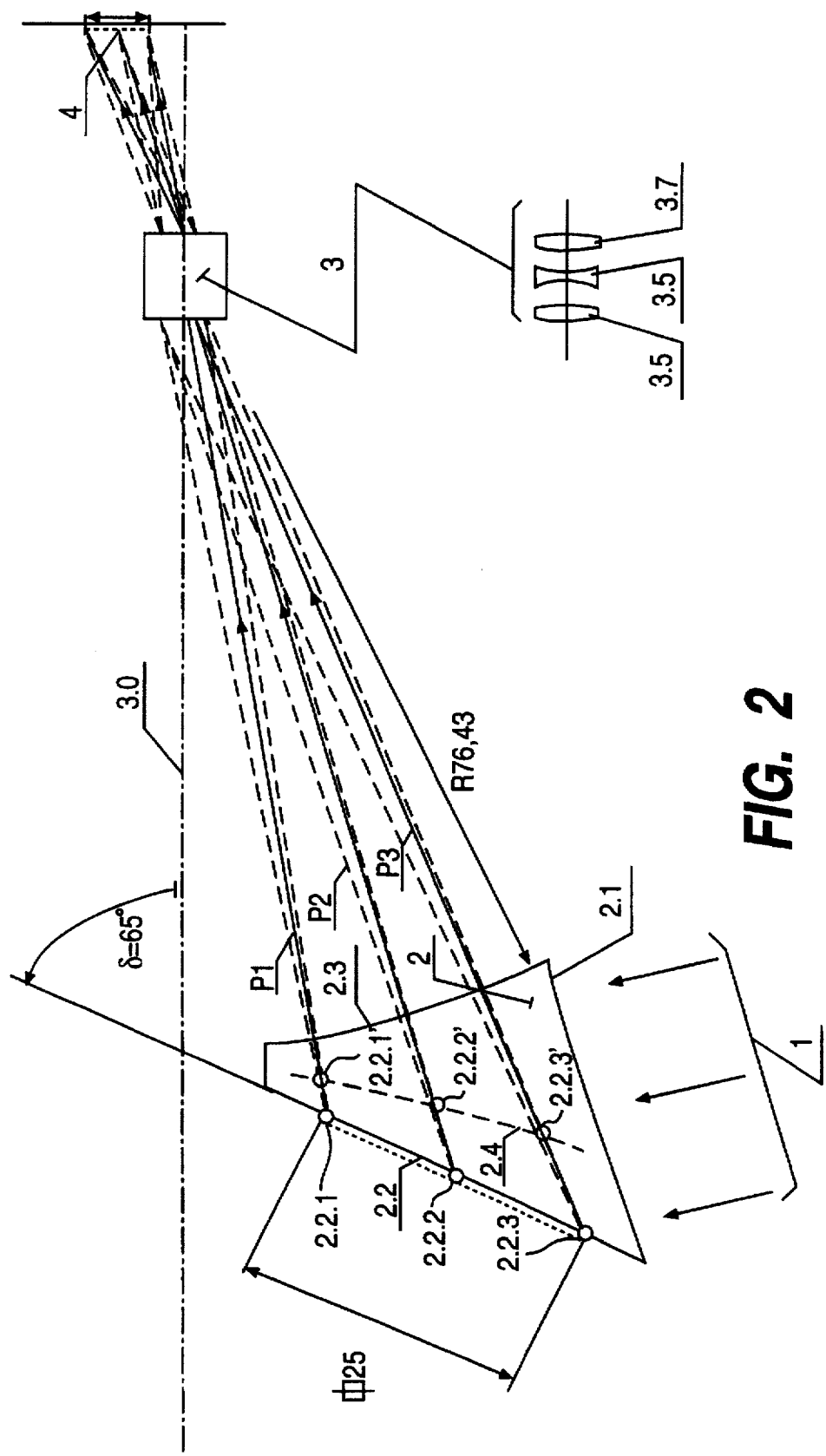

FIG. 1 shows the schematic arrangement of a first embodiment of the optical imaging system according to the invention; and FIG. 2 shows a further embodiment.

In the fingerprint imaging optical system shown in FIG. 1 a prism 2 has a total reflection object plane 2.2 which closes an angle of δ=45° with the optical axis 3.0 of optics 3. The illumination of the total reflection object plane 2.2 occurs through lower surface 2.1 of the prism 2 by means of a light source 1 of nearly collimated monochromatic rays. The fingerprint will be formed in a field of the object plane 2.2 being 25 mm×25 mm and illustrated by points 2.2.1, 2.2.2, 2.2.3. The object field of the above size is arranged in an offset position relative to the optical axis 3.0. The image of the fingerprint will be formed by a spherical surface 2.3 of the prism towards the optics 3 which has a relative aperture of f/6, and the refraction index of the material of the prism is n≈1.5. In this embodiment the radius of curvature of the spherical surface 2.3 is R=75 mm. The spherical surface 2.3 of the prism 2 performs the function of a correction prism by creating the image of the fingerprint with points 2.2.1, 2.2.2, 2.2.3 in a virtual surface 2.4 with corresponding points 2.2.1', 2.2.2', 2.2.3'. The average angle between the surface 2.4 and the optical axis 3.0 is larger than the angle of the object plane 2.2. The existence of the spherical surface 2.3 makes it possible that the difference in the path length of main rays P1, P2, P3 starting from extreme points 2.2.1, 2.2.2, 2.2.3 of the fingerprint will be less than 4%.

The image of the fingerprint created by the spherical surface 2.3 on the surface 2.4 will substantially coincide with the Petzval-field of the optics 3. In that case the Petzval-sum of the optics 3 will be P=−0.1. The quasi-symmetric optics 3 which consists of four lenses i.e. collecting lens 3.1, diffraction lens 3.2, diffraction lens 3.3 and collecting lens 3.4 together with a Petzval-sum of −0.1, will provide a good quality image in the image plane of the optics 3 which is normal to the optical axis and where an image detector 4 can be arranged also in offset position relative to the optical axis 3.0. The image detector 4 is preferably a CCD detector of sufficient resolution. The "trapezoid" distortion for the central point 2.2.2 of the object field of the fingerprint with a size of 25 mm×25 mm at the object plane 2.2 will be about 8% in case if the angle of inclination of the object plane is 45°.

FIG. 2 shows a further embodiment of the imaging system according to the invention wherein the angle between the total reflection object surface 2.2 of the prism 2 with the optical axis 3.0 is δ=6520. The illumination of the prism 2 occurs in the same way as in case of the previous embodiment. The field for the fingerprint has a size of 25 mm×25 mm on the total reflection object plane 2.2 of the prism 2, which is again in offset position relative to the optical axis 3.0 of the optics 3. The prism 2 has a refraction index n≈1.8, and the image of the fingerprint will pass through the spherical surface 2.3 of the prism 2 towards the optics 3. The central point of the curvature of the spherical surface 2.3 falls on the optical axis 3.0 in the close vicinity of the input pupil of the optics 3, and the radius of its curvature is R=76.43 mm. The function of this spherical surface 2.3 is the same as in the first embodiment. With the arrangement of FIG. 2 the difference between the effective optical path lengths of the main rays starting from the central point of the field of the fingerprint till the image plane will be less than 2%, and this is largely due to the presence of the spherical surface 2.3.

The image of the fingerprint as formed on the virtual surface 2.4 makes it possible that the Petzval-sum of the optics 3 be as high as P=0.3. The optics 3 will consist in this embodiment of only three lenses i.e. of collecting lens 3.5, diffraction lens 3.6 and collecting lens 3.7. The optics 3 provides a high quality image in the image plane normal to the optical axis 3.0 where the image detector 4 is arranged. The "trapezoid" distortion relative to the central point 2.2.2 of the field of the fingerprint at the object plane 2.2 will be ±4%. The extent of the point-spread function lies between 10–35 µm being sufficient to reach very good image resolution.

The embodiments shown in FIGS. 1 and 2 correspond to the two extreme values of the practically realizable range. Between these extreme values several other intermediate embodiments can be realized which can all be characterized by the following properties:

1) The prism 2 as an object plane being offset from the optical axis 3.0 of the optics 3 and the closest surface of the prism 2 to the optics 3 is the spherical surface 2.3 and the central point of curvature of this surface falls on the optical axis 3.0 at the proximity of the input pupil of the optics 3.

2) As a function of the angle of inclination between the total reflection object plane 2.2 and the optical axis 3.0, the values of the refraction index n, the difference dP in the effective optical path length of the main rays P1, P2, P3, the Petzval-sum P, the number of lenses and the relative aperture f/NO of the optics 3 as well as the amount of "trapezoid" distortion T are given in Table 1 below.

TABLE 1

| δ | n | P | $f_{NO}$ | P | Number of lenses | T |
|---|---|---|---|---|---|---|
| 45° | 1,50 | 4% | $f_{/6}$ | −0,1 | 4 | ±8% |
| . | . | . | . | . | . | . |
| . | . | . | . | . | . | . |
| 65° | 1,85 | 2% | $f_{/3,5}$ | 0,3 | 3 | ±4% |

To obtain a good quality image certain relationships between the focal distances $f_i$ of the lenses constituting the optics 3 and the resulting focal distance f of the optics 3 should be kept. In case of the embodiment with four lenses this relationship is:

$$\frac{f_{3,1}}{f} = \frac{|f_{3,2}|}{f} = \frac{|f_{3,3}|}{f} = \frac{f_{3,4}}{f} = 0,28 \ldots 0,44,$$

In case of the second embodiment with three lenses, the function is as follows:

$$\frac{f_{3,5}}{f} = 0,5 \ldots 0,8, \frac{|f_{3,6}|}{f} = 0,35 \ldots 0,55, \frac{f_{3,7}}{f} = 0,5 \ldots 0,8.$$

In preferable embodiments of the optics 3 for four and three lenses, respectively, the actual parameters of the optics are given in tables 2 and 3. Table 2 refers to the first embodiment with four lenses and Table 3 to the second embodiment with three lenses. In the tables Ri designates the radius of curvature of the ith surface, wherein the number is positive in case of a convex surface and negative if the surface is concave. The serial number i increases from the light source towards the image plane. The lens li designates the ith lens, di designates the thickness the ith lens li along the optical axis, ni designates the refraction index of the ith lens li, eij designates the spacing along the optical axis between the lenses li and lj.

TABLE 2

| radius of curvature (mm) | | lens | thickness (mm) | refraction index |
|---|---|---|---|---|
| R1 | 7,94 }  | 11 | d1 = 1,5 | n1 = 1,76 |
| R2 | −15,17 } | | | |
| | | | e1,2 = 0,55 | |
| R3 | −8,71 } | 12 | d2 = 0,8 | n2 = 1,65 |
| R4 | 10,15 } | | | |
| | | | e2,3 = 1,3 | |
| R5 | −11,43 } | 13 | d3 = 0,6 | n3 = 1,65 |
| R6 | 9,83 } | | | |
| | | | e3,4 = 0,78 | |
| R7 | 20,82 } | 14 | d4 = 1,2 | n4 = 1,76 |
| R8 | −6,79 } | | | |

TABLE 3

| radius of curvature (mm) | lens | thickness (mm) | refraction index |
|---|---|---|---|
| R1  8,31 | | | |
| R2  45,06 } | 11 | d1 = 1,78 | n1 = 1,80 |
| | | e1,2 = 2,02 | |
| R3  −14,17 | | | |
| R4  8,31 } | 12 | d2 = 0,71 | n2 = 1,61 |
| | | e2,3 = 1,17 | |
| R5  33,24 | | | |
| R6  −13,17 } | 13 | d3 = 1,87 | n3 = 1,82 |

We claim:

1. Optical imaging system for imaging an object, mainly for a fingerprint reading apparatus, comprising:

a total reflection prism (2) with a total reflection surface having a center (2.2.2) and constituting an object plane (2.2) for receiving the object, the total reflection prism (2) having a first transmitting surface (2.1) for receiving light to illuminate the object when placed on said object plane (2.2) through the interior of the prism (2), and a second transmitting surface (2.3) for transmitting the light reflected from said total reflection surface;

optical means (3) having an optical axis and an input and output pupil, said input pupil receiving the reflected light transmitted through the second transmitting surface (2.3) and said optical means (3) forming the image of the object plane (2.2) in an image plane which is perpendicular to the optical axis; and electronic image detector means (4) located in the image plane, characterized in that said center (2.2.2) of the object plane (2.2) is offset from the optical axis (3.0) in a direction perpendicular to and relative to the optical axis (3.0) and said image detector means (4) is also offset from the optical axis (3.0) in accordance with said image formation by said optical means (3).

2. The imaging system as claimed in claim 1, characterized in that the object plane (2.2) closes an angle between 45° and 65° with the optical axis (3.0) and the refraction index of the total reflection prism (2) is between 1.5 and 1.85.

3. The imaging system as claimed in claim 1, characterized in that the second surface (2.3) of the total reflection prism (2) is a curved surface which images the object plane (2.2) into a further curved surface (2.4) falling in the interior of the prism (2), and the angle between this further curved surface (2.4) and the optical axis (3.0) is higher than the angle between the object plane (2.2) and the optical axis (3.0).

4. The imaging system as claimed in claim 3, characterized in that said curved surface (2.3) is spherical and the radius of its curvature falls in the optical axis (3.0) in the close region of the input pupil of the optical means (3).

5. The imaging system as claimed in any one of claims 2–4, characterized in that said optical means (3) has a relative aperture between f/6 and f/3.5 and the Petzval sum of the optical means (3) is between −0.1 and 0.3.

6. The imaging system as claimed in claim 5, characterized in that the optical means (3) comprises three single lenses (3.5, 3.6 and 3.7) and the normalized focal lengths of the lenses fall in the following ranges:

$$0.5 \leq f3.5 \leq 0.8;\ 0.35 \leq f3.6 \leq 0.55\ \text{and}\ 0.5 \leq f3.7 \leq 0.8.$$

7. The imaging system as claimed in claim 6, characterized in that the object plane (2.2) of the total reflection prism (2) closes an angle of 65° with the optical axis (3.0), the second surface (2.3) is spherical and the radius thereof lies between about 76 and 77 mm and its center point falls on its center point of the input pupil of the optical means (3).

8. The imaging system as claimed in claim 6, characterized in that the radii of curvature (R1 ... R6) of the lenses (3.5, 3.6 and 3.7) of the optical means (3), the thicknesses d1, d2, d3 of the lenses measured along the optical axis (3.0), the spacings e1.2 and e2.3 therebetween as well as the values of the refraction indices n1, n2, n3 are substantially as defined in the following table:

| radius of curvature (mm) | lens | thickness (mm) | refraction index |
|---|---|---|---|
| R1  8.31 | | | |
| R2  45.06 } | 11 | d1 = 1.78 | n1 = 1.80 |
| | | e1,2 = 2.02 | |
| R3  −14.17 | | | |
| R4  8.31 } | 12 | d2 = 0.71 | n2 = 1.61 |
| | | e2,3 = 1.17 | |
| R5  33.24 | | | |
| R6  −13.17 } | 13 | d3 = 1.87 | n3 = 1.82 |

9. The imaging system as claimed in claim 5, characterized in that the optical means (3) comprises four single lenses (3.1, 3.2, 3.3 and 3.4) and the relationship between focal distances (f3.1, f3.2, f3.3 and f3.4) thereof and the normalized focal lengths of the four lenses fall in the following ranges:

$$0.28 \leq f3.1\ \text{and}\ f3.2\ \text{and}\ f3.3\ \text{and}\ f3.4 \leq 0.44.$$

10. The imaging system as claimed in claim 9, characterized in that the object plane (2.2) of the total reflection prism (2) closes an angle of 45° with the optical axis (3.0), the second surface (2.3) is spherical and the radius thereof is about 75 mm and its center point falls on the center point of the input pupil of the optical means (3).

11. The imaging system as claimed in claim 9, characterized in that the radii of curvature (R1, ... R8) of the lenses (3.1, 3.2, 3.3 and 3.4) of the optical means (3), the thicknesses d1, d2, d3, d4 of the lenses measured along the optical axis (3.0), the spacings e1.2, e2.3 and e3.4 therebetween as well as the values of the refraction indices n1, n2, n3 and n4 are substantially as defined in the following table:

| radius of curvature (mm) | lens | thickness (mm) | refraction index |
|---|---|---|---|
| R1  7.94 | | | |
| R2  −15.17 } | 11 | d1 = 1.5 | n1 = 1.76 |
| | | e1,2 = 0.55 | |
| R3  −8.71 | | | |
| R4  10.15 } | 12 | d2 = 0.8 | n2 = 1.65 |
| | | e2,3 = 1.3 | |
| R5  −11.43 | | | |
| R6  9.83 } | 13 | d3 = 0.6 | n3 = 1.65 |
| | | e3,4 = 0.78 | |
| R7  20.82 | | | |
| R8  −6.79 } | 14 | d4 = 1.2 | n4 = 1.76 |

* * * * *

UNITED STATES PATENT AND TRADEMARK OFFICE
CERTIFICATE OF CORRECTION

PATENT NO. : 5,764,347
DATED : June 9, 1998
INVENTOR(S) : András Podmaniczky et al.

It is certified that error appears in the above-identified patent and that said Letters Patent is hereby corrected as shown below:

On the Title Page, item [75], in the Inventors, line 1, "Kallo" should read --Kalló--;

On the Title Page, item [57], in the Abstract, in lines 2, 7, and 15, "reflexion" should read --reflection--;

Claim 7, column 6, line 3, "its" (second occurrence) should read --the--;

Claim 11, column 6, line 42, after "R1", delete --,--.

Signed and Sealed this

Twenty-seventh Day of October, 1998

Attest:

BRUCE LEHMAN

Attesting Officer

Commissioner of Patents and Trademarks